No. 636,876. Patented Nov. 14, 1899.
H. P. WELLS & O. MORRILL.
AXLE AND AXLE BOX.
(Application filed July 11, 1899.)
(No Model.)
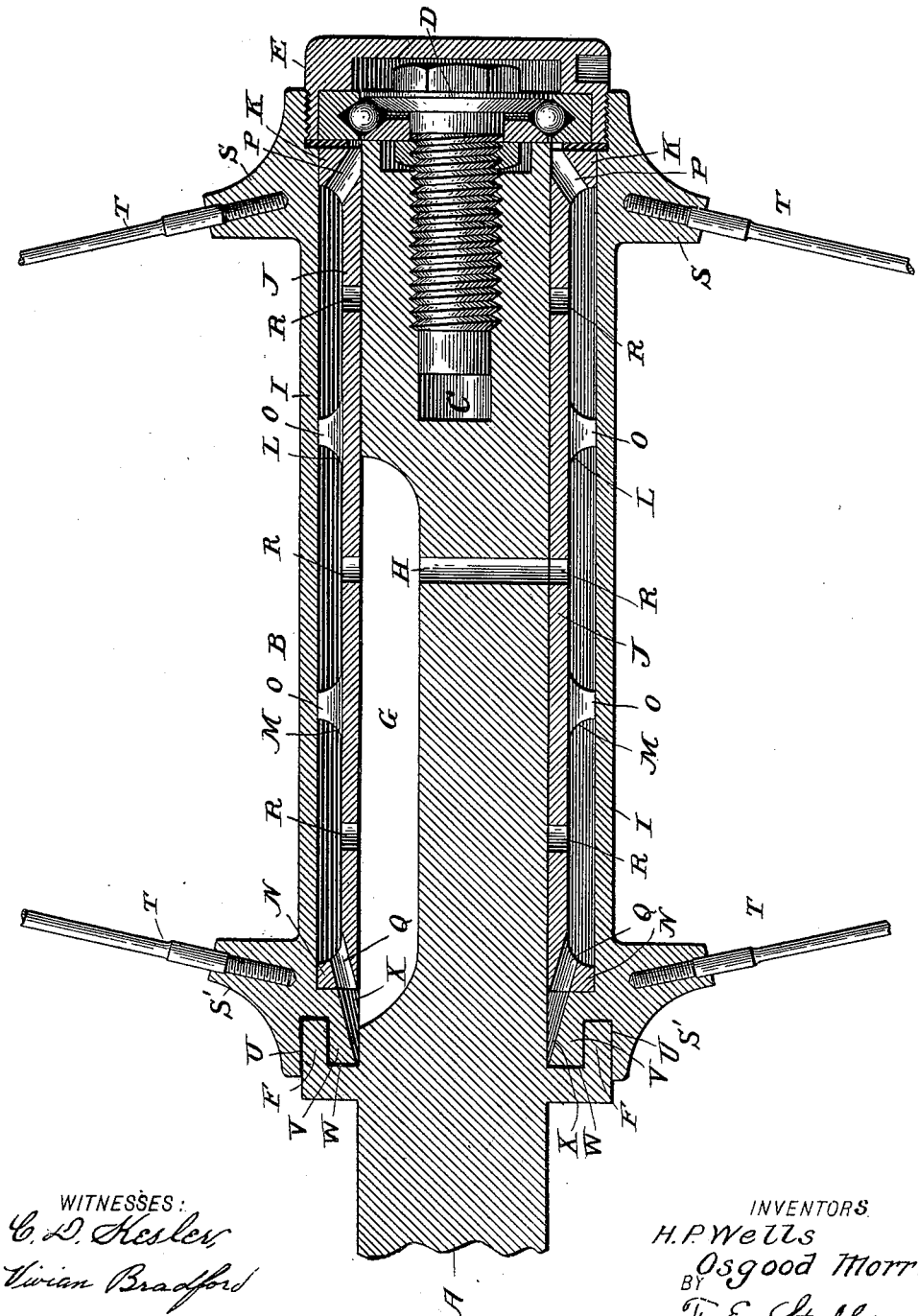
WITNESSES:
C. D. Kesler
Vivian Bradford
INVENTORS
H. P. Wells
Osgood Morrill
BY F. E. Stebbins,
ATTORNEY

UNITED STATES PATENT OFFICE.

HARLAN P. WELLS AND OSGOOD MORRILL, OF AMESBURY, MASSACHUSETTS.

AXLE AND AXLE-BOX.

SPECIFICATION forming part of Letters Patent No. 636,876, dated November 14, 1899.

Application filed July 11, 1899. Serial No. 723,492. (No model.)

*To all whom it may concern:*

Be it known that we, HARLAN P. WELLS and OSGOOD MORRILL, citizens of the United States, residing at Amesbury, in the county of Essex and State of Massachusetts, have invented certain new and useful Improvements in Axles and Axle-Boxes, of which the following is a specification sufficiently full, clear, and accurate to enable those skilled in the art to make and use the same.

The main object of our invention is the production of an axle and axle-box adapted to receive and retain a lubricant and to distribute the same uniformly between the surfaces in frictional contact when the wheel is revolved, the construction of the said axle and box being such that the lubricant cannot escape at the ends or dust and dirt enter.

A further object is the production of an axle and box provided with a reservoir for holding a relatively large quantity of lubricant, said reservoir to be in direct communication with the axle by a plurality of openings preferably arranged in series.
A further object is the production of an axle and box adapted to hold a lubricant, the construction being such that the lubricant which is distributed to the inner ends of the axle and box will be returned by gravity to the reservoir.

Finally and generally our object is the production of an axle and box adapted for automatic lubrication when the wheel is revolved and which shall possess the characteristics of simplicity of construction, durability, and efficiency in operation.

With these ends in view our invention consists in certain novelties of construction and combinations and arrangement of parts hereinafter set forth, and pointed out in the claims.

The accompanying drawing illustrates one example of the physical embodiment of our invention made by the best mode we have so far devised for the application of the principle.

The single figure shows a longitudinal sectional elevation view of the above-mentioned example, the combined axle and axle-box being united and the constituent parts somewhat enlarged, so as to more clearly indicate the construction and arrangement.

Referring to the figure, the letter A designates the axle, which in this instance is solid; B, the axle-box as a whole; C, a threaded opening in the end of the axle; D, a ball-bearing cage provided with a threaded end which is adapted to fit the threaded opening C in the axle; E, a threaded cap which when in position holds the ring of the ball-bearing cage immovably against the end of the box, completely closes the end opening of the box, and prevents the outward flow of the lubricant and likewise the entrance of dust or dirt; F, a circular collar of larger diameter than the axle and of the general shape illustrated; G, a longitudinal groove in the top of the axle, and H a hole extending from the bottom of the groove G entirely through the body of the axle.

The letter I designates the outer shell or wall of the axle-box; J, the inner shell or wall of the same.

K L M N are spacing-rings located between the shells I and J, as shown, two rings being interposed between the walls at opposite ends and the others disposed intermediate and at about equal distance from the ends.

O designates two series of holes made in the rings L M, whereby lubricant can circulate throughout the reservoir formed by the unoccupied space between the outer and inner walls.

P designates a series of holes made through the inner wall J adjacent the ring K at the outer ends of the axle and box; Q, a series of holes made through the inner wall J adjacent the spacing-ring N at the inner end of the box.

R are three series of holes made through the inner wall of the box, each series being located between two spacing-rings, as shown.

S S' are circular outwardly-projecting flanges concentric with the axle-box, one being located at each end of the box.

T are spokes secured to or seated in the flanges S S' in any desirable way.

U is a circular groove made in the inner end of the box and within which is fitted the collar F of the axle.

V designates a flange, which forms one wall of the groove U at the inner end of the box and the edge of which abuts against the perpendicular flange which unites the axle proper and the collar; W, a circular recess between the collar F and the axle proper, adapted to receive the flange V; and X is an open space formed between the axle and the flange V when the axle and box are united.

The following novel features of construction and arrangement are especially to be noted, to wit: The series of holes R, located between the spacing-rings L and M, register with the hole H, made in the axle. The inner end of the groove G is in open communication with the open space X, between the axle and the flange V, at the inner end of the box. The holes Q afford communication between the reservoir proper and the open space X, before mentioned, and the collar F is in direct frictional contact throughout with the walls forming the groove U.

The mode of operation is as follows: The lubricant having been introduced into the reservoir in any way—preferably through the holes P, when the cap and ball-bearing cage are removed—and the wheel revolved, the same is carried around with the box and distributed uniformly to the main part of the axle through the series of holes R. Some of the lubricant will pass through the holes P and lubricate the ball-thrust-bearing cage and some will also reach the open space X at the inner end of the box. Part of the lubricant in this open space X will, under the action of gravity, flow through the hole Q at the bottom back into the reservoir or space between the inner and outer shells, and the remaining portion will be carried to the top of the axle and flow into the groove G and then pass to the hole H. There is thus a constant tendency to work the lubricant from the space X to the reservoir and thus prevent its exudation around the collar F to the outside of the box. Part of the lubricant which is carried to the top of the axle intermediate of the ends will also be collected by the groove G and flow downwardly through the hole H to the inner surface of the wall J and intermittently pass to the reservoir by way of the holes R.

While we have shown only one example of the physical embodiment of our invention, we do not thereby intend that such example shall be exhausted of it, inasmuch as the same may be embodied in other forms and by other modes. Minor changes in construction may likewise be introduced at the discretion of the manufacturer. For instance, a common nut may be substituted for the ball-bearing cage to hold the axle in the box, the spacing-rings K L M N be separate or integral with either shell, the flanges S S', either or both, be made separate from the outer shell, and other colorable modifications made at will. These and other unsubstantial alterations we intend to embrace within the scope of our claims.

What we claim as new, and desire to secure by Letters Patent, is—

1. An axle and an axle-box; the former provided at the inner end with a flanged collar, F, and at the outer end with means for holding the same within the box; and the latter comprising inner and outer walls and having a groove, U, to receive the collar, a reservoir for a lubricant between its walls, holes through the inner wall, and means for completely closing the end of the box to prevent the exudation of the lubricant and the entrance of dirt or dust; in substance as set forth.

2. An axle and an axle-box; the former having a collar closely fitting within a groove at the end of the latter, and also provided with attaching means at the outer end; and the latter consisting of two concentric shells or walls united adjacent the ends by spacing-rings, the inner shell being provided with holes for the passage of a lubricant, and a removable cap secured to the end of the box and completely closing the same; in substance as set forth.

3. The combination with an axle, of an axle-box, said box consisting of two concentric shells or walls united by spacing-rings, the inner shell having series of perforations, and holes, Q, communicating with space X at one end; and means for closing the ends of the box to prevent the escape of the lubricant normally held in the open space between the shells or walls; in substance as set forth.

4. The combination with an axle of an axle-box constructed substantially as set forth; said box consisting of two shells or walls spaced apart, and having an opening, P, for the introduction of lubricant between the walls; holes through the inner shell or wall and a cap, E, detachably secured to the box; in substance as set forth.

5. The combination with an axle of an axle-box constructed substantially as set forth; said box consisting of two shells separated by spacing-rings, K, L, M, N, the rings, L, M, having grooves or notches, O, and the inner shell provided with holes, R; in substance as set forth.

6. The combination with an axle of an axle-box constructed substantially as set forth; said box comprising inner and outer walls and having a reservoir for lubricant between its walls, and holes, Q, at one end, one of said walls having a flange V, said holes communicating with the circular space, X, between the axle and the said flange; in substance as set forth.

7. The combination with an axle of an axle-box constructed substantially as set forth; said axle having a groove, G, and hole, H, and said box provided with a reservoir for lubricant, and holes for distributing the same to the axle; in substance as set forth.

8. The combination with an axle of an axle-box constructed substantially as set forth; the axle having a groove, G, and hole, H, and the said box having a reservoir for lubricant, and holes, R, registering with the hole, H; in substance as set forth.

9. The combination with an axle of an axle-box; said axle having a groove, G, communicating at one end with the space, X, and with the hole, H, and the box provided with a reservoir for lubricant, and holes for distributing the same to the axle; in substance as set forth.

10. The combination with an axle of an axle-box and a cap; said box having a groove, U, a threaded end, a reservoir for lubricant, and holes, P; the axle having a collar, F, and means for holding it within the box; and the cap provided with threads for engaging the threaded end of the box; in substance as set forth.

11. An axle having a ball thrust-bearing in combination with a box comprising inner and outer walls constituting a reservoir for lubricant, and holes P leading from the reservoir to the ball thrust-bearing; and a cap to retain the lubricant; in substance as set forth.

12. The combination with an axle, of an axle-box consisting of two concentric shells united by spacing-rings, the inner shell having perforations and the rings provided with holes O; a cap at the outer end of the box, and means at the inner end of the axle and box to prevent the exudation of lubricant; in substance as set forth.

13. The combination of an axle having a ball thrust-bearing at the outer end; an axle-box comprising an outer shell and a perforated inner shell forming a reservoir for lubricant and having passages from the reservoir to the ball-bearing; and a cap, E, entirely closing the outer end of the box; in substance as set forth.

In testimony whereof we affix our signatures in presence of two witnesses.

HARLAN P. WELLS.
OSGOOD MORRILL.

Witnesses:
GEORGE H. BRIGGS,
DELL W. DOLBIER.